UNITED STATES PATENT OFFICE.

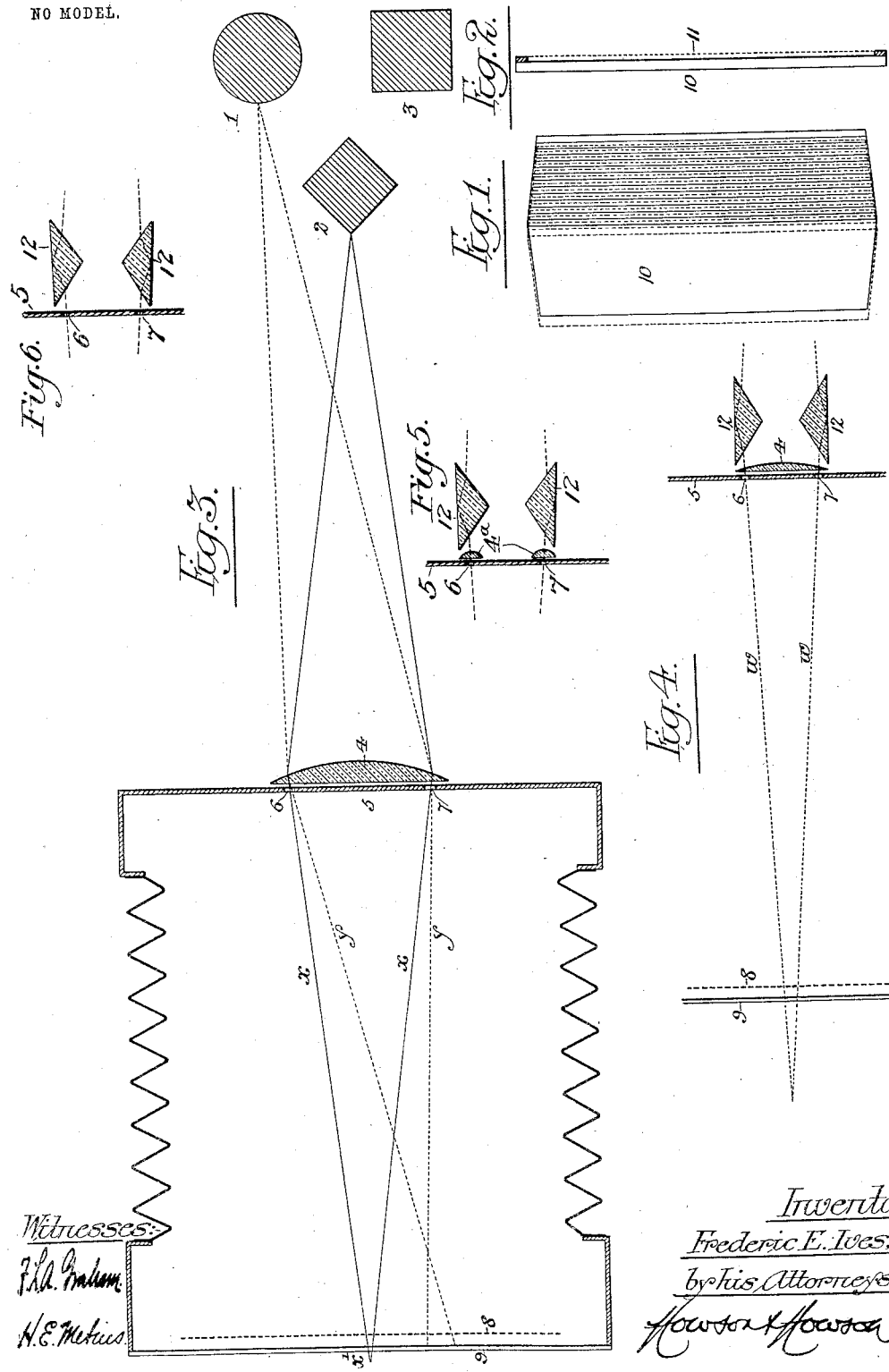

FREDERIC E. IVES, OF PHILADELPHIA, PENNSYLVANIA.

PARALLAX STEREOGRAM AND PROCESS OF MAKING SAME.

SPECIFICATION forming part of Letters Patent No. 725,567, dated April 14, 1903.

Application filed September 25, 1902. Serial No. 124,849. (No model.)

*To all whom it may concern:*

Be it known that I, FREDERIC E. IVES, a citizen of the United States, residing in Philadelphia, Pennsylvania, have invented certain Improvements in Parallax Stereograms and Processes of Making the Same, of which the following is a specification.

My invention consists of a stereogram which when seen from a suitable view-point without the aid of any optical device appears in solid relief like an ordinary double stereogram when viewed in a stereoscope.

The stereogram consists of a single transparent photographic image divided into lines, each alternate one of said lines corresponding to a portion of the respective element of a double stereogram, the photograph having the appearance that would be obtained by printing the two halves of an ordinary double stereogram in superposition upon one surface. In front of this stereogram is placed a transparent-line screen, consisting of opaque lines with clear spaces between them, there being as many clear spaces as there are lines in the photograph belonging to a single element of the stereogram. The line-screen is superposed upon the photograph with a definite separation therefrom, calculated by reason of the parallax of vision with two eyes to make all of the lines belonging to one of the stereoscopic elements visible to one eye only and all belonging to the other stereoscopic element visible to the other eye only. The result is that when using the eyes as in ordinary vision, from a suitable view-point, the right eye seeing only the lines of the photograph which belong to the right-hand element of the stereogram and the left eye only the lines belonging to the left-hand element of the stereogram, the objects photographed appear to stand out solidly as in a stereoscope.

In the accompanying drawings, Figure 1 is a view of a double-image stereogram in accordance with my invention. Fig. 2 is a sectional view showing the relation to the stereogram of the transparent line-viewing screen. Fig. 3 is a diagram illustrating a method of producing stereograms in accordance with my invention. Fig. 4 is a diagram illustrating another method of producing the same, and Figs. 5 and 6 are views illustrating certain modified arrangements of devices for use in making the stereogram.

In Fig. 3, in which 1 2 3 are objects to be photographed, 4 is a lens of three or more inches in diameter, 5 is a diaphragm-plate having two small apertures 6 and 7 with a separation equal to the normal pupillary distance of the human eyes—say about two and a half inches from center to center—8 is a line-screen, and 9 is a photographic sensitive plate. Light-rays $x\ x$, coming from the object 2 through the apertures 6 and 7, are bent inward and brought to a focus at $x'$ by refraction through the lens 4. Under the conditions illustrated, with the sensitive plate 9 occupying a plane intermediate between the point $x'$ and the line-screen 8, the object 2 will be imaged on the plane of the sensitive plate by both pencils of rays in juxtaposed lines and in the finished result will appear to be situated at the plane of the photograph; but objects at other distances, such as the objects 1 and 3, owing to the crossing of the pencils from the two apertures not occurring at the plane of the sensitive plate, will form two laterally-separated partial images, as shown by the dotted lines $y\ y$, and will appear in the finished result as if occupying a different plane from the object 2.

The photograph constituting one element of the parallax stereogram is a transparent positive print 10, made from a negative which may have been produced in the manner described, and it presents two superposed images, one displaced slightly in a lateral direction in respect to the other, as shown, for instance, by full and dotted lines in Fig. 1. This photograph, in combination with its covering line-screen 11, is viewed as a transparency, preferably from the screen side.

The lines of the viewing-screen must be made parallel to the lines in the photographic image and should have such lateral adjustment as may be necessary to make the elements of the right-eye picture visible to the right eye when held in a plane at right angles to the line of vision, the separation of screen and photograph being such that at the same time the elements of the left-eye picture are made visible by parallax of vision to the left eye. The photographic screen 8 and viewing-screen 11 should be identical in character and preferably with the black lines somewhat broader than the intermediate clear spaces.

The method as so far described is simple and is practically efficient when the stereogram subtends only a small angle of view. In order, however, that the path of the rays from every part of the stereogram may be absolutely identical, both in photographing and in viewing, the image formed through each aperture in the camera should be laterally inverted, so that the two pencils of light belonging to near objects bisect before reaching the screen and the pencils from far objects after passing through it. This may be effected by placing laterally-inverting prisms in front of the lens-apertures, as shown, for instance, at 12 in Fig. 4, in which $w\ w$ represent the paths of rays coming from an object more distant from the lens on one side than the screen and sensitive plate are on the other. In this case the completed stereogram, owing to the necessity for mounting the line-screen facing the film side on the glass in order to get it close enough for correct parallax, will show the objects laterally reversed; but when it is important to avoid this reversal the object may be photographed in a mirror, or Porro prisms or other total-inversion devices may be substituted for the ordinary laterally-inverting prisms. The camera may also be made perfectly efficient with other modifications of construction. For example, when the prisms 12 of Fig. 4 are employed two small lenses $4^a$, as shown in Fig. 5, may be placed over the apertures 6 and 7 instead of the single large lens, the prisms being disposed so as to direct the two pencils or rays toward the axis of the camera in the same manner as the prismatic edges of the single lens, and this method of controlling the parallax independently of the focal length of the lenses possesses certain practical advantages. It is also possible when employing the laterally-inverting prisms to dispense with lenses altogether by making the apertures so minute, as shown in Fig. 6, that they form what are known as "pin-hole" images.

Owing to the limitations imposed upon the draftsman, no attempt has been made in the various views of the drawings to show the relative sizes of the parts or the relative distance of one part from another.

Having thus described my invention, I claim and desire to secure by Letters Patent—

1. A photograph consisting of a composite image, in juxtaposed lines, of the elements of an ordinary double stereogram, exposed to view through a screen of alternate opaque and transparent lines, so adjusted as to give a stereoscopic effect by the parallax of binocular vision, substantially as specified.

2. The mode herein described of producing a parallax stereogram, said mode consisting in directing separated pencils of rays from the object through a line-screen onto a sensitive plate separated from said line-screen, then producing a positive image of the object from said plate, and then mounting said positive image behind and at a distance from a viewing-screen having lines parallel with those of the image, substantially as specified.

In testimony whereof I have signed my name to this specification in the presence of two subscribing witnesses.

FREDERIC E. IVES.

Witnesses:
F. E. BECHTOLD,
JOS. H. KLEIN.